(12) United States Patent
Norton

(10) Patent No.: US 9,638,198 B2
(45) Date of Patent: May 2, 2017

(54) SHAFTLESS TURBOCHARGER

(71) Applicant: BorgWarner Inc., Auburn Hills, MI (US)

(72) Inventor: John David Norton, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/630,152

(22) Filed: Feb. 24, 2015

(65) Prior Publication Data

US 2016/0245115 A1 Aug. 25, 2016

(51) Int. Cl.
*F04D 25/04* (2006.01)
*F01D 25/16* (2006.01)
*F16C 35/063* (2006.01)
*F16C 33/58* (2006.01)
*F16C 33/60* (2006.01)
*F16C 19/18* (2006.01)

(52) U.S. Cl.
CPC ............ *F04D 25/04* (2013.01); *F01D 25/16* (2013.01); *F16C 33/581* (2013.01); *F16C 33/60* (2013.01); *F16C 35/063* (2013.01); *F05D 2220/40* (2013.01); *F16C 19/184* (2013.01); *F16C 2360/24* (2013.01)

(58) Field of Classification Search
CPC .... F04D 13/04; F04D 29/0563; F04D 29/059; F04D 29/0462; F04D 29/043; F04D 29/044; F04D 25/04; F04D 25/045; F04D 13/021; F04D 13/043; F04D 29/002; F04D 29/05; F04D 29/053; F04D 29/054; F04D 29/056; F04D 29/086; F04D 29/20; F04D 29/582; F01D 25/16; F01D 25/162; F01D 5/026; F05D 2230/21; F05D 2230/60; F05D 2240/54; F05D 2240/60; F16C 19/08; F16C 19/18
USPC ................................................. 384/476, 900
See application file for complete search history.

(56) References Cited

U.S. PATENT DOCUMENTS

| | | | | |
|---|---|---|---|---|
| 3,132,594 | A | * | 5/1964 | Shiley ............... F01D 25/246 415/139 |
| 3,326,613 | A | * | 6/1967 | Renker ............. B23Q 11/0003 29/898.14 |
| 3,692,436 | A | * | 9/1972 | Connor .................. F01D 5/043 417/406 |
| 4,486,147 | A | | 12/1984 | Byrne et al. |
| 4,518,315 | A | | 5/1985 | Krueger |
| 4,550,237 | A | * | 10/1985 | Merkelbach ........ B60B 27/0005 219/121.14 |
| 4,586,878 | A | * | 5/1986 | Witchger ................. F02C 6/12 415/166 |

(Continued)

Primary Examiner — Bryan Lettman
Assistant Examiner — Timothy Solak
(74) Attorney, Agent, or Firm — BrooksGroup

(57) ABSTRACT

A product for use with a turbocharger is disclosed. The product may include a housing with an opening extending through at least part of the housing. An outer bearing race may be positioned in the opening. An inner bearing race may be rotatably positioned in the outer bearing race. A turbine wheel may be fixed to one end of the inner bearing race. A compressor wheel may be fixed to another end of the inner bearing race. The inner bearing race may be comprised of one, two, or more race sections. The turbine wheel may be connected to the compressor wheel only through the inner bearing race or race sections.

28 Claims, 3 Drawing Sheets

(56) References Cited

U.S. PATENT DOCUMENTS

| | | | | |
|---|---|---|---|---|
| 4,722,630 A | | 2/1988 | Fang | |
| 4,798,320 A | | 1/1989 | Fang | |
| 5,055,009 A | * | 10/1991 | Gutknecht | F01D 25/125 384/476 |
| 5,890,881 A | * | 4/1999 | Adeff | F01D 25/145 415/111 |
| 6,971,801 B2 | * | 12/2005 | Miyazaki | F16C 25/083 384/504 |
| 8,475,114 B2 | * | 7/2013 | Rosen | F16C 3/02 29/889.1 |
| 8,814,538 B2 | | 8/2014 | House et al. | |
| 2005/0111971 A1 | * | 5/2005 | Fukizawa | F04D 25/04 415/204 |
| 2007/0134105 A1 | * | 6/2007 | Beers | F04D 25/04 417/407 |
| 2007/0204615 A1 | * | 9/2007 | Vrbas | F01D 17/162 60/602 |
| 2009/0136334 A1 | * | 5/2009 | Cornelio | F01D 5/027 415/1 |
| 2012/0023931 A1 | * | 2/2012 | House | F01D 25/16 60/598 |
| 2012/0282078 A1 | * | 11/2012 | Marsal | F04D 29/059 415/1 |

\* cited by examiner

SHAFTLESS TURBOCHARGER

TECHNICAL FIELD

The field to which the disclosure generally relates includes turbocharger systems and in particular, may include turbocharger construction to address heat transfer issues while reducing part count and complexity.

BACKGROUND

Turbocharger systems may be employed with internal combustion engines to pre-charge combustion air. A turbocharger system may include a driven compressor wheel and a driving turbine wheel. The turbine wheel may be connected to the compressor wheel by a common shaft wherein rotation of the turbine wheel drives the compressor wheel through the common shaft to charge the combustion air. The turbocharger's turbine wheel, compressor wheel, and the common shaft may rotate at speeds that approach hundreds of thousands of revolutions per minute. In addition, the turbine wheel operates in a high temperature exhaust gas environment, wherein heat may be transferred to the other turbocharging system components. Under these harsh, and increasingly demanding operating conditions, the turbocharging system components are expected to operate for a lifespan of many years during which they continue to function with the engine to which the system is applied. To perform as expected, the design of the turbocharging system components must be robust to survive as expected, while still being cost effective.

SUMMARY OF ILLUSTRATIVE VARIATIONS

A product for use with a turbocharger system according to a number of variations may include a housing with an opening extending through at least part of the housing. An outer bearing race may be positioned in the opening. An inner bearing race may be rotatably positioned in the outer bearing race. A turbine wheel may be fixed to one end of the inner bearing race. A compressor wheel may be fixed to another end of the inner bearing race. The inner bearing race may be comprised of one, two, or more race sections. The turbine wheel may be connected to the compressor wheel only through the inner bearing race or race sections.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
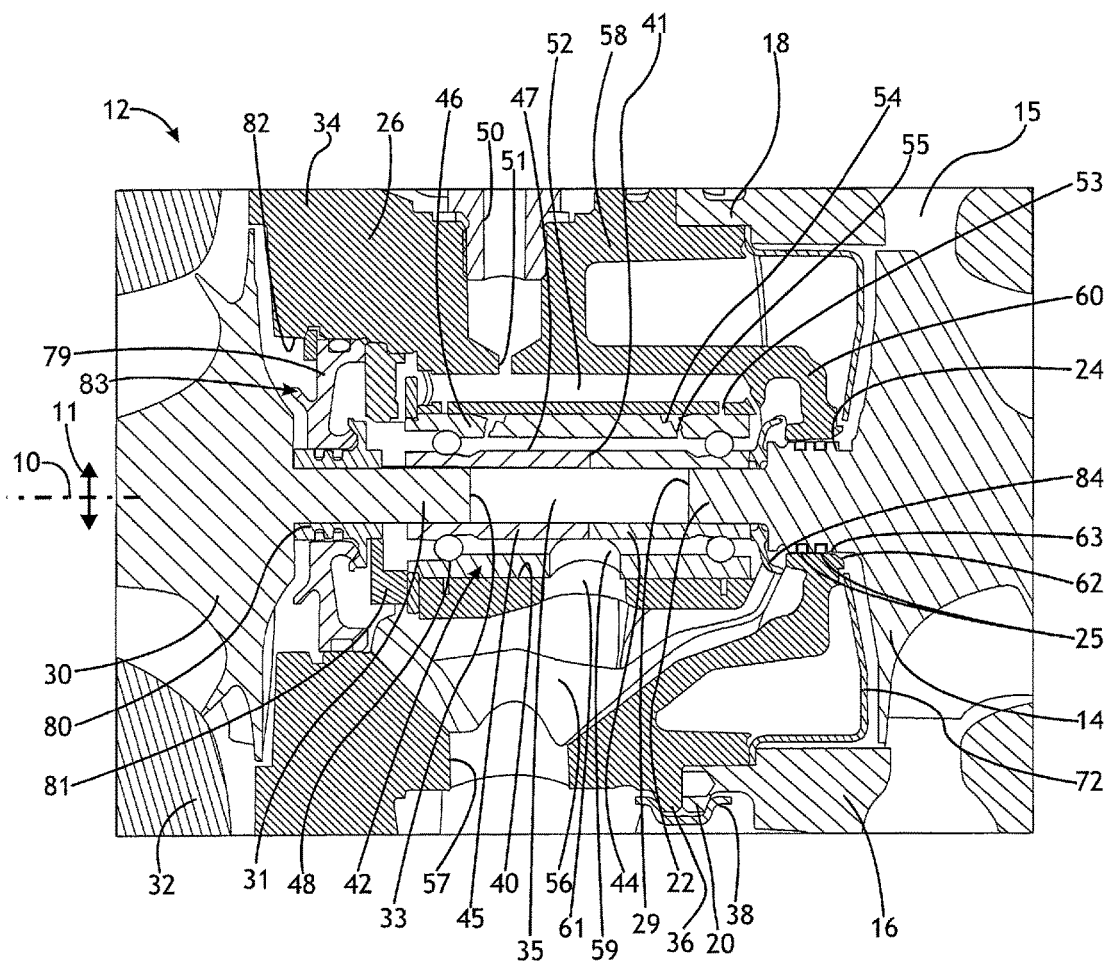
FIG. 1 is a fragmentary cross sectional illustration of a product for use with a turbocharger system according to a number of variations.

In the description associated with FIG. 1, elements may be described in relation to the direction in which parts are disposed. In this regard, reference number 10 indicates a line that extends in the axial direction through the wheel centerline of rotation or central axis. An axial extending part will extend on a line parallel to, or on, the central axis. A line that extends in the radial direction 11, will be one that extends toward or away from the central axis, and generally at ninety degrees relative thereto, which includes vertical lines as viewed in FIG. 1.

In the product 12, which may be used with a turbocharger system for an internal combustion engine and in particular, with a turbocharger core or cartridge assembly, a turbine wheel 14 as shown in FIG. 1 may exist in a continuous high velocity jet of exhaust gases entering through the volute 15 when the engine is running. The volute 15 may be defined by a turbine housing 16, which includes an axially extending flange 18 that terminates at a radially outward extending flange 20. The turbine wheel 14 may include an axially extending stub 22. The stub 22 may include an enlarged segment 24 adjacent or near the turbine wheel 14. The segment 24 may have a number of annular grooves holding piston type seal rings 25. The stub 22 may extend in the axial direction 10 along the central axis, and into a center housing referred to as the bearing housing 26. The stub 22 may include a reduced segment at or near an end 29 and may be integrally formed with the turbine wheel 14 through casting, or machining, or both, or other processes.

The product 12 may include a compressor wheel 30 that may be disposed in a compressor housing 32. The compressor housing 32 may be connected to the bearing housing 26. The compressor wheel 30 may include an axially extending stub 31. The stub 31 may extend through a flinger 80, which is further described below. The stub 31 may extend in the axial direction 10 along the central axis, and into a center housing referred to as the bearing housing 26. The stub 31 may include an end 33 and may be integrally formed with the compressor wheel 30 through casting, or machining, or both, or other processes. The end 33 may be facing and spaced apart from the end 29 so that an area 35 that would typically be occupied by a shaft connecting the turbine wheel 14 to the compressor wheel 30 is an open shaft. The absence of a complete shaft significantly reduces heat transfer, particularly by conduction from the turbine wheel 14 to the compressor wheel 30.

The bearing housing 26 may include a flange 34 on the compressor side, which extends outwardly in the radial direction 11 and may be configured for connection to the compressor housing 32. A number of fasteners (not shown), may be used to secure the bearing housing 26 to the compressor housing 32. The bearing housing 26 may also have a flange 36 on the turbine side, which may be configured to mate with the flange 20 of the turbine housing 16. A band clamp 38 may be used to secure the bearing housing 26 to the turbine housing 16.

An opening may be provided in the bearing housing 26 about the central axis forming a bearing cavity 40. The bearing cavity 40 may extend along the central axis and around the open area 35. A bearing assembly 42 may be positioned in the bearing cavity 40 and may include a pair of inner races 44 and 45 and an outer race 46. The inner races 44 and 45 may have a hollow, substantially cylindrical shape, and may have inner edges that meet and abut one another at a junction 41. The outer race 46 may also have a hollow, substantially cylindrical shape and may fit closely within the bearing cavity 40. A cylindrically shaped gap 47 may be provided between the inner races 44, 45 and the outer race 46, with annular grooves in the inner and outer races carrying a number of balls 48 so that the inner and outer races may freely rotate relative to one another.

The bearing assembly 42 may be lubricated, and an oil delivery system may be provided with a supply line at fitting 50, which may be interconnected with an associated engine's pressurized oil delivery system. The bearing assembly may be provided with a supply of oil through bore 51 which extends in the radial direction, and through the interconnected bore 52, which extends in the axial direction 10 alongside the bearing cavity 40. The bore 52 may be intersected by a number of annular grooves 53 that extend around the central axis interconnecting the bore 52 with the bearing cavity 40. In addition, a number of angled grooves 54 may be formed in the outer surface of the outer race 46 with intersecting oil jets 55 that open to the gap 47, to supply oil to the balls 48. The bearing housing 26 may have an oil collection cavity 56 with an oil drain 57 that may return oil to the associated engine. The outer race 46 may have an opening 59 that aligns with an opening 61 in the bearing housing 26 that opens to the cavity 56. The opening 59 may be positioned radially outward from the junction 41.

During assembly, when the inner races 44, 45 are positioned in the outer race 46, their abutting edges at the juncture 41 may be joined by welding such as through an e-beam shot through the opening 59 in the outer race 46. Other joining processes may be employed with access gained through the opening 59. During further assembly of the product 12, the stub 22 may be pressed into the inner race 44 to join the turbine wheel 14 to the inner race 44. The stub 31 may be pressed into the inner race 45 to join the compressor wheel 30 to the inner race 45. Alternatively, the stubs 22, 31 may be splined to the interior of the inner races 44, 45, or may be connected by brazing, welding, or other joining methods. When assembled, the turbine wheel 14, the compressor wheel 30 and the inner races 44, 45 will rotate as a unit, supported by balls 48 in the outer race 46.

The bearing housing 26 may have a wall section 58 extending axially toward the turbine wheel 14 and extending around the circumference of the bearing cavity 40. The wall section 58 may turn radially inward and connect with a turbine end spacer wall 60 that surrounds the turbine end of the bearing housing 26. The turbine end spacer wall 60 may include an annular ring segment 62 that defines an end opening 63 in the turbine end spacer wall 60 about the central axis that opens to the bearing cavity 40. The bearing segment 24 may be positioned in the end opening 63 and may rotate therein. A heat shield 72 may be positioned on an end of the bearing housing 26 to block heat from the turbine area.

The product 12 may include a compressor seal assembly 83 disposed around the central axis in opening 82. The seal assembly 83 may include an insert 79 that may be seated against the bearing housing 26 and a mating flinger 80 that may be disposed around the stub 31. In addition, a collar 81 may be seated against the bearing housing 26 and may engage the outer race 46 of bearing assembly 42 on the compressor end. A flinger 84 may be positioned around the shaft 22 at the turbine end of the bearing assembly 42.

Figure 2:
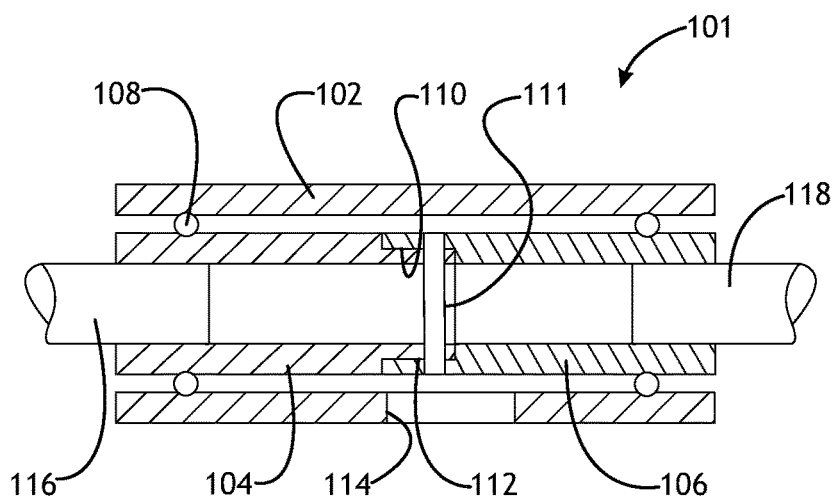
FIG. 2 is a schematic cross sectional illustration of a bearing assembly according to a number of variations.

Referring to FIG. 2, a bearing assembly 101 according to a number of variations may include an outer race 102 within which a pair of inner races 104 and 106 are rotatably supported by a number of balls 108. The inner race 106, at its inner edge, may include an inward facing splined section 110 that receives an outward facing splined section 112 formed at an inner edge of the inner race 104. The races 104 and 106 may be secured together with a pin 111 or other retaining method applied through an opening 114 in the outer race 102. A wheel stub 116 may be secured in the inner race 104 and a wheel stub 118 may be secured in the inner race 106.

Figure 3:
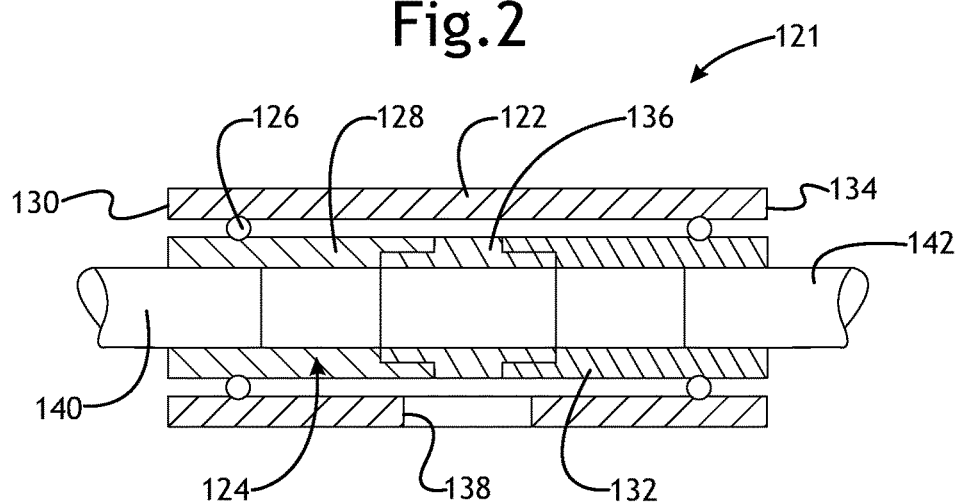
FIG. 3 is a schematic cross sectional illustration of a bearing assembly according to a number of variations.

Referring to FIG. 3, a bearing assembly 121 according to a number of variations may include an outer race 122 within which an inner race assembly 124 may be rotatably supported by a number of balls 126. The inner race assembly 124 may include a section 128 that extends into the outer race 122 through a first end 130. The inner race assembly 124 may include a section 132 that extends into the outer race 122 through a second end 134. A section 136 may be secured between the sections 128 and 132 so that the inner race assembly 124 comprising the section 128, 132, and 136 rotates within the outer race 122 as a unit. Pins or other retention methods such as an e-beam weld or brazing, may be applied to secure the sections with access gained through an opening 138 in the outer race 122. A wheel stub 140 may be secured in the section 128 and a wheel stub 142 may be secured in the section 132. The segment 136 may be made from a material that resists heat transfer, such as ceramic, to inhibit the transfer of heat through the inner race assembly 124, between the stubs 140 and 142.

Figure 4:
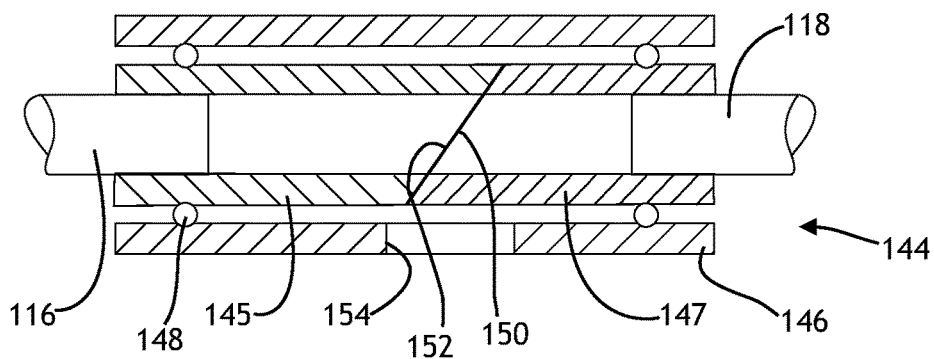
FIG. 4 is a schematic cross sectional illustration of a bearing assembly according to a number of variations.

In a number of other variations as illustrated in FIG. 4, a bearing assembly 144 may include an outer race 146 within which a pair of inner races 145 and 147 are rotatably supported by a number of balls 148. The inner race 147 may include a slanted end face 152 at its inner edge that mates with a slanted end face 150 formed at the inner edge of the inner race 145. The slanted end faces 150, 152 result in an open elliptical shaped interface between the inner races 145 and 147. The races or race sections 145 and 147 may be left without an additional joining method or secured together by a retaining mechanism applied at the juncture between the end sections 150, 152 and through an opening 154 in the outer race 146. A wheel stub 116 may be secured in the inner race 145 and a wheel stub 118 may be secured in the inner race 147.

Figure 5:
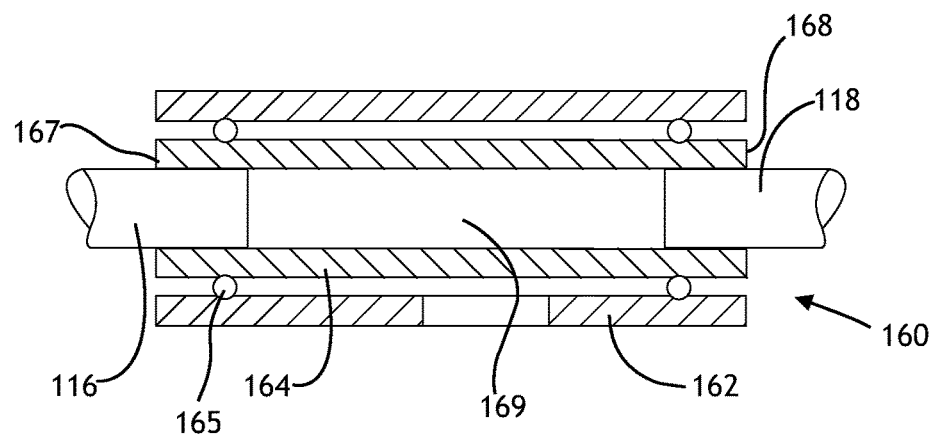
FIG. 5 is a schematic cross sectional illustration of a bearing assembly according to a number of variations.

Other variations as illustrated in FIG. 5, may include a bearing assembly 160 with an outer race 162 within which an inner race 164 is rotatably supported by a number of balls 165. The inner race 164 may be one piece and may include a first end 167 and a second end 168. A wheel stub 116 may be secured in the first end 167 of the inner race 164 and a wheel stub 118 may be secured in the second end 168 of the inner race 147. The wheel stub 116 may be connected to the wheel stub 118 solely through the inner race 164. An air space 169 may exist within the inner race 164 between the wheel stub 116 and the wheel stub 118. The air space 169 may inhibit the transfer or heat between the wheel stub 118 and the wheel stub 116.

Figure 6:
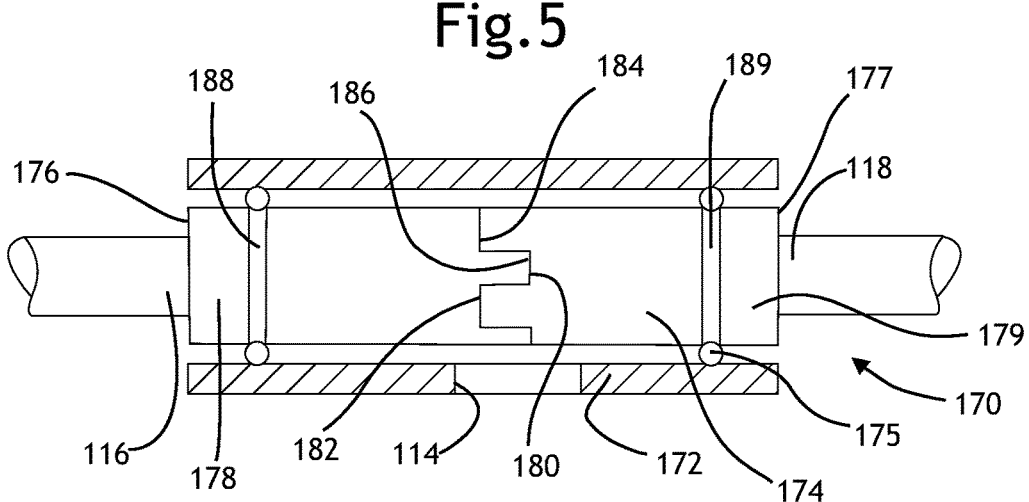
FIG. 6 is a schematic partial cross sectional illustration of a bearing assembly according to a number of variations.

Additional variations as illustrated in FIG. 6, may include a bearing assembly 170 with an outer race 172 within which an inner race 174 is rotatably supported by a number of balls 175. The inner race 174 is shown in perspective without being sectioned, and may include grooves 188 and 189 in its outer surface as runners for the balls 175. The inner race 174 may include a first end 176 and a second end 177. A wheel stub 116 may be secured in the first end 176 of the inner race 174 and a wheel stub 118 may be secured in the second end 177 of the inner race 174. The wheel stub 116 may be connected to the wheel stub 118 solely through the inner race 174. The inner race 174 may include an inner race section 178 and an inner race section 179 that are joined by a castellated interface with notched ends 180 and 182. The inner race section 178 may be of a hollow cylindrical construction and the notched end 180 may include a series of notches 184 at its inner edge. The inner race section 179 may be of hollow cylindrical construction and the notched end 182 may include a series of notches 186 at its inner edge. The notches and the notched ends may interlock to form the joined inner race 174 from the inner race section 178 and the inner race section 179. The mating surfaces between the inner race section 178 and the inner race section 179 may be left without an additional joining method or secured by a variety of retention methods.

Figure 7:
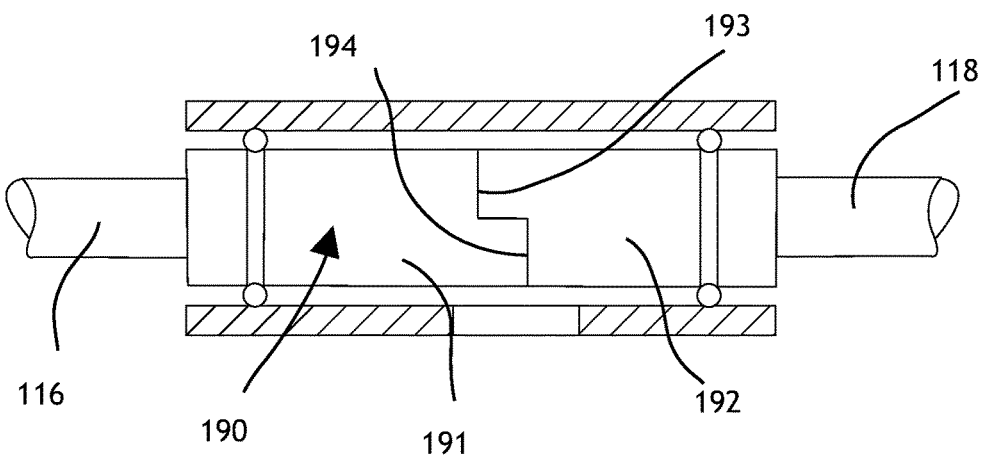
FIG. 7 is a schematic partial cross sectional illustration of a bearing assembly according to a number of variations.

Other variations as illustrated in FIG. 7, may include a bearing assembly with an inner race 190. The inner race 190 is shown in perspective without being sectioned, similar to the illustration in FIG. 6. A wheel stub 116 may be secured in one end of the inner race 190 and a wheel stub 118 may be secured in the other end of the inner race 190. The wheel stub 116 may be connected to the wheel stub 118 solely through the inner race 190. The inner race 190 may include an inner race section 191 and an inner race section 192, which are joined by a notched interface with notched ends 193 and 194 mating together. The inner race section 191 may be of a hollow cylindrical construction and the notched end 193 may be formed at its inner edge by a single notch removing a semi-circular section. The inner race section 192 may be of hollow cylindrical construction and the notched end 194 may be formed at its inner edge by a single notch removing a semi-circular section. The notches and the notched ends may interface to form the cylindrically shaped and joined inner race 190 from the inner race section 191 and the inner race section 192. The mating surfaces between the inner race section 191 and the inner race section 192 may be left without an additional joining method or secured by a variety of retention methods.

Through the foregoing variants, the amount of heat transferred from the turbine wheel to the compressor wheel is reduced. The typical shaft connecting the compressor and turbine wheels is eliminated, along with its cost and weight. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product for use with a turbocharger system and may include a housing with an opening extending through at least part of the housing. An outer bearing race may be positioned in the opening, and the outer bearing race may have a first end and a second end opposite the first end. An inner bearing race rotatably positioned in the outer bearing race. A turbine wheel may be fixed to the inner bearing race. A compressor wheel may be fixed to the second inner bearing race. The turbine wheel may be connected to the compressor wheel only through the inner bearing race.

Variation 2 may include a product according to variation 1 wherein the inner bearing race may include a first inner bearing race section connected to the compressor wheel and a second inner bearing race section connected to the turbine wheel and further comprising an inner race section connected between the first inner bearing race section and the second inner bearing race section, wherein the inner race section is constructed of a material that resists heat transfer.

Variation 3 may include a product according to variation 1 wherein the turbine wheel may include a first stub pressed into the inner bearing race and wherein the compressor wheel includes a second stub pressed into the inner bearing race, and wherein the first stub does not directly contact the second stub so that an open space is defined inside the inner bearing race between the first stub and the second stub.

Variation 4 may include a product according to variation 1 wherein the inner bearing race may include a first inner bearing race section connected to the compressor wheel and a second inner bearing race section connected to the turbine wheel. The first inner bearing race section may be connected by a joining process to the second inner bearing race section when the first and second inner bearing race sections are positioned in the outer bearing race.

Variation 5 may include a product according to variations 1 through 4 wherein an opening may be provided in a side of the outer bearing race.

Variation 6 may include a product according to variation 2 wherein the first and second inner bearing race sections may be supported in the outer bearing race by a number of balls.

Variation 7 may include a product according to variation 2 wherein the first inner bearing race section may have a first notched end and wherein the second inner bearing race section may have a second notched end that mates with the first notched end.

Variation 8 may include a product for use with a turbocharger system and may include a turbine wheel that may have a first extending stub. The turbine wheel may be configured to rotate in response to a flow of exhaust gas. A compressor wheel may have a second extending stub and may be configured to compress gas. A bearing assembly may rotatably support the turbine wheel and the compressor wheel. The bearing assembly may define an open shaft with a first end and a second end. The first extending stub may extend into the open shaft through the first end and the second extending stub may extend into the open shaft through the second end. The first extending stub may not directly contact the second extending stub so that a substantial part of the open shaft remains open.

Variation 9 may include a product according to variation 8 wherein the bearing assembly may include a first inner bearing race and a second inner bearing race, each supported in an outer bearing race. The first and second inner bearing races may define the open shaft.

Variation 10 may include a product according to variation 9 wherein the first and second inner bearing races may be supported in the outer bearing race by a number of balls.

Variation 11 may include a method of constructing a turbocharger assembly and may include the step of providing a housing. An outer bearing race may be provided wherein the outer bearing race may have a first end, a second end opposite the first end, and an opening between the first and second ends. A first inner bearing race may be provided that may have a first inner edge. A second inner bearing race may be provided that may have a second inner edge. The first inner bearing race may be positioned inside the outer bearing race through the first end so that the first edge faces inside the outer bearing race. The second inner bearing race may be positioned inside the outer bearing race through the second end so that the second edge abuts the first edge. The first edge may be attached to the second edge. The outer bearing race may be positioned in the housing. A turbine wheel may be attached to the first inner bearing race, and a compressor wheel may be attached to the second inner bearing race.

Variation 12 may include a method according to variation 11 and may include the steps of extending a joining process tool through the opening to access the first and second inner bearing races, and joining the first edge to the second edge.

Variation 13 may include a method according to variation 11 and may include the step of providing a splined connection between the first inner bearing race and the second inner bearing race.

Variation 14 may include a method according to any of variations 11 through 13 and may include casting the turbine wheel with an integral first stub, and casting the compressor wheel with an integral second stub. The first stub may be pressed into the first inner bearing race. The second stub may be pressed into the second inner bearing race.

Variation 15 may include a method according to any of variations 11 through 14 and may include the step of providing an open air gap in the first and second inner bearing races between the turbine wheel and the compressor wheel.

Variation 16 may include the method according to variation 11 and may include cutting a notch in each of the first and second inner edges.

Variation 17 may include the method according to variation 11 and may include forming a slant in each of the first and second inner edges.

Variation 18 may include the method according to variation 11 and may include cutting castellation notches in each of the first and second inner edges.

Variation 19 may include the method according to variation 11 and may include forming an inward facing splined section at the first inner edge. An outward facing splined section may be formed at the second inner edge. The second inner edge may be inserted into the first inner edge.

Variation 20 may include the method according to variation 11 and may include positioning a heat transfer resistant section between the first and second inner edges.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising:
    a housing with an opening extending through at least part of the housing;
    an outer bearing race positioned in the opening, and fixed relative to the housing;
    a first inner bearing race rotatably positioned in the outer bearing race;
    a turbine wheel fixed to the first inner bearing race;
    a second inner bearing race rotatably positioned in the outer bearing race; and
    a compressor wheel fixed to the second inner bearing race;
    the first and second inner bearing races separate from one another and mating at a junction;
    wherein the turbine wheel is fixedly connected to the compressor wheel only through the first and second inner bearing races which are connected at the junction.

2. The product according to claim 1 wherein the inner bearing race includes a first inner bearing race section connected to the compressor wheel and a second inner bearing race section connected to the turbine wheel and further comprising an inner race section connected between the first inner bearing race section and the second inner bearing race section, wherein the inner race section includes first and second reduced diameter segment extending into the first and second inner bearing race sections respectively, and includes shoulders against which the first and second inner bearing race sections engage, and the inner race section is secured to the first and second inner bearing race sections so that the inner race section and the first and second inner bearing race sections rotate together as a unit.

3. The product according to claim 1 wherein the turbine wheel includes a first stub pressed into the first inner bearing race and wherein the compressor wheel includes a second stub pressed into the second inner bearing race, and wherein the first stub does not directly contact the second stub so that an open space is defined within the first and second inner bearing races between the first stub and the second stub.

4. The product according to claim 1 wherein the housing has a bottom below the outer bearing race that defines a second opening wherein a first inner bearing race section is connected to the compressor wheel and a second inner bearing race section is connected to the turbine wheel wherein the first inner bearing race section overlaps the second inner bearing race section at the junction when the first and second inner bearing race sections are positioned in the outer bearing race, wherein the outer bearing race has a side that defines a third opening that is aligned with the second opening.

5. The product according to claim 4 wherein the turbine and compressor wheels rotate about a central axis and wherein a radial direction is defined perpendicular to the central axis and further comprising a pin connecting the first and second inner bearing races at the junction, the pin elongated in the radial direction and aligned with the second and third openings.

6. The product according to claim 4 further comprising a pin, wherein the first and second inner bearing race sections are connected by the pin.

7. The product according to claim 4 wherein the first inner bearing race section has a first notched end and wherein the second inner bearing race section has a second notched end that mates with the first notched end.

8. The product according to claim 1 wherein the turbine wheel has a first extension that includes a stub extending into the first inner bearing race and includes an enlarged segment adjacent the stub, the enlarged segment disposed outside and spaced apart from the inner bearing race, and the enlarged segment has a diameter larger than the stub, the enlarged segment fitted in an end opening of the housing and supported by the housing, and wherein the compressor wheel includes a wheel section and a second extension extending from the wheel section to a terminal end, and the second extension has a constant diameter from the wheel section to the terminal end.

9. The product according to claim 1 wherein the housing includes a turbine end wall defining an end opening, the turbine wheel includes a first extending stub that includes an enlarged segment positioned in the end opening and supported on the turbine end wall, the compressor wheel includes a second extending stub, and further comprising a seal assembly supported on the housing, the second extending stub extending through the seal assembly, and an insert seated on the housing, the second stub extending through the insert and supported thereby.

10. A product for use with a turbocharger system comprising:
a turbine wheel that has a first extending stub, the turbine wheel configured to rotate in response to a flow of exhaust gas;
a compressor wheel that has a second extending stub, the compressor wheel configured to compress gas;
a bearing assembly rotatably supporting the turbine wheel and the compressor wheel to rotate about a central axis, the bearing assembly has an inner race rotatably supported in an outer race, the inner race connecting the turbine wheel with the compressor wheel and defining an open shaft within the inner race that extends along the central axis with a first end and a second end and that presents an open area, wherein the first extending stub extends into the open shaft through the first end and the second extending stub extends into the open shaft through the second end and the first extending stub does not directly contact the second extending stub so that the open shaft remains open across the central axis, the open area being unobstructed from the first extending stub to the second extending stub, reducing heat transfer there between.

11. The product according to claim 10 wherein the inner bearing race is supported in the outer bearing race by rolling balls, wherein inner bearing race includes first and second inner bearing races and the first and second inner bearing races define the open shaft.

12. The product according to claim 11 wherein the bearing assembly further comprises an inner race section connected between the first and second inner bearing races, the inner race section comprising a ceramic material that resists heat transfer and the inner race section includes a first extension extending into the first inner bearing race and includes a second extension extending into the second inner bearing race.

13. A product comprising a turbocharger with a turbine wheel, a compressor wheel connected to rotate together with the turbine wheel, a housing positioned between the turbine wheel and the compressor wheel, the housing containing a bearing that has an inner race supported by a number of balls to rotate relative to the housing, wherein the compressor and turbine wheels rotate about a central axis, wherein the inner race defines an open shaft that extends along the central axis within the inner race and has a first end and a second end, wherein the turbine wheel includes a first extending stub that extends into the open shaft through the first end and the compressor wheel includes a second extending stub that extends into the open shaft through the second end, and the first extending stub does not directly contact the second extending stub, wherein a segment of the open shaft remains completely open in an axial direction along a length of the central axis between the first extending stub and the second extending stub and the segment of the open shaft also remains completely open in a radial direction across the central axis to inhibit heat transfer from the turbine wheel to the compressor wheel so that an open space is bounded only by the inner race and the first and second extending stubs, and wherein the inner race, first extending stub, and the second extending stub are the sole elements that rotatably connect the turbine wheel and the compressor wheel.

14. The product according to claim 13 wherein the housing includes a turbine end wall defining an end opening, the first extending stub including an enlarged segment positioned in the end opening and supported on the turbine end wall, and further comprising a seal assembly supported on the housing, the second extending stub extending through the seal assembly, and an insert seated on the housing, the second stub extending through the insert and supported thereby.

15. The product according to claim 14 further comprising a seal ring sealing between the enlarged segment and the turbine end wall in the end opening, and a flinger positioned between the second extending stub and the insert.

16. The product according to claim 13 wherein the inner race comprises a hollow cylindrical structure that is centered on the central axis and that extends in an axial direction along the central axis and that defines the open shaft with a first end and a second end, the inner race further comprising a first inner bearing race section that extends from the first end toward the second end and a second inner bearing race section that extends from the second end toward the first end wherein a gap is defined between the first inner bearing race section and the second inner bearing race section, and an inner race section is positioned in the gap, the inner race section including a first extension extending into the first inner bearing race section and including a second extension extending into the second inner bearing race section.

17. The product according to claim 13 wherein the turbocharger includes a turbine end that contains the turbine wheel and that defines a volute channeling exhaust gas to the turbine wheel and includes a compressor end that contains the compressor wheel and that collects air charged by the compressor wheel, the product inhibiting heat transfer from the exhaust gas to the compressor wheel and the air.

18. The product according to claim 13 further comprising a pin wherein the inner race comprises a first inner bearing race and an overlapping second inner bearing race, and the pin extends across the central axis and through the first and second inner bearing races.

19. A method of constructing a product according to claim 13 comprising:
providing the housing;
providing an outer bearing race wherein the outer bearing race has a first end, a second end opposite the first end, and an opening between the first and second ends;
providing the inner race with a first inner bearing race that has a first inner edge;
providing the inner race with a second inner bearing race that has a second inner edge;
positioning the first inner bearing race inside the outer bearing race through the first end so that the first edge faces inside the outer bearing race;
positioning the second inner bearing race inside the outer bearing race through the second end so that the second inner edge abuts the first inner edge;
attaching the first inner edge to the second inner edge;
positioning the outer bearing race in the housing;
attaching a turbine wheel to the first inner bearing race; and
attaching a compressor wheel to the second inner bearing race.

20. The method according to claim 19 including the steps of:
accessing through the opening the first and second inner bearing races, and joining the first inner edge to the second inner edge.

21. The method according to claim 19 including the step of providing a splined connection between the first inner bearing race and the second inner bearing race.

22. The method according to claim 19 including the steps of:
   casting the turbine wheel with an integral first stub;
   casting the compressor wheel with an integral second stub;
   pressing the first stub into the first inner bearing race; and
   pressing the second stub into the second inner bearing race.

23. The method according to claim 19 including the step of providing an open air gap in the first and second inner bearing races between the turbine wheel and the compressor wheel.

24. The method according to claim 19 further comprising cutting a notch in each of the first and second inner edges.

25. The method according to claim 19 further comprising forming a slant in each of the first and second inner edges.

26. The method according to claim 19 further comprising cutting castellation notches in each of the first and second inner edges.

27. The method according to claim 19 further comprising
   forming an inward facing splined section at the first inner edge;
   forming an outward facing splined section at the second inner edge; and
   inserting the second inner edge into the first inner edge.

28. The method according to claim 19 further comprising positioning a heat transfer resistant section between the first and second inner edges.

\* \* \* \* \*